United States Patent
Mason

(10) Patent No.: US 10,778,362 B2
(45) Date of Patent: Sep. 15, 2020

(54) ENHANCED LORAN (ELORAN) SYSTEM HAVING DIVIDED NON-STATION SPECIFIC ELORAN DATA

(71) Applicant: EAGLE TECHNOLOGY, LLC, Melbourne, FL (US)

(72) Inventor: Gary W. Mason, Rockledge, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 27 days.

(21) Appl. No.: 16/228,850

(22) Filed: Dec. 21, 2018

(65) Prior Publication Data

US 2020/0204283 A1 Jun. 25, 2020

(51) Int. Cl.
*H04J 3/16* (2006.01)
*G01S 1/24* (2006.01)
*H04J 3/24* (2006.01)

(52) U.S. Cl.
CPC ............ *H04J 3/1676* (2013.01); *G01S 1/245* (2013.01); *H04J 3/245* (2013.01)

(58) Field of Classification Search
CPC .............................. H04W 4/024; H04W 4/029
See application file for complete search history.

(56) References Cited

U.S. PATENT DOCUMENTS

| | | |
|---|---|---|
| 4,134,117 A | 1/1979 | Robinson et al. |
| 4,268,830 A | 5/1981 | Brodeur |
| 4,300,139 A | 11/1981 | Wurst et al. |
| 4,318,105 A | 3/1982 | Brodeur |
| 4,325,067 A | 4/1982 | Brodeur |
| 4,377,866 A | 3/1983 | Janc et al. |
| RE31,254 E | 5/1983 | Brodeur |
| 4,482,896 A | 11/1984 | Menick |
| RE31,962 E | 7/1985 | Brodeur |
| 8,903,016 B2 | 12/2014 | Walton et al. |
| 9,948,452 B1 * | 4/2018 | Pearson ............ H04W 56/0015 |

(Continued)

FOREIGN PATENT DOCUMENTS

WO 2018044834 3/2018

OTHER PUBLICATIONS

Helwig et al., "State of the art in low frequency (LF) technology for alternative positioning, navigation, timing, and data (APNT&D)", 24th International Technical Meeting of the Satellite Division, Sep. 2011, pp. 3288-3300.

(Continued)

*Primary Examiner* — Gregory B Sefcheck
*Assistant Examiner* — Debebe A Asefa
(74) *Attorney, Agent, or Firm* — Allen, Dyer, Doppelt + Gilchrist, P.A.

(57) ABSTRACT

An enhanced LOng RAnge Navigation (eLORAN) system may include a plurality of eLORAN stations, each having an eLORAN antenna and an eLORAN transmitter that may transmit data over an eLORAN data channel and may transmit a series of eLORAN navigation RF pulses. An eLORAN control station may generate station specific eLORAN data and non-station specific eLORAN data, divide the non-station specific eLORAN data into non-specific eLORAN data subsets, and cause each eLORAN station to transmit the station specific eLORAN data and a corresponding non-station specific eLORAN data subset over the eLORAN data channel in a manner to optimize data throughput.

19 Claims, 5 Drawing Sheets

(56) References Cited

U.S. PATENT DOCUMENTS

| | | | |
|---|---|---|---|
| 2003/0152112 A1 | 8/2003 | Almog et al. | |
| 2008/0144744 A1* | 6/2008 | Parakh | G01S 1/245 375/331 |
| 2010/0061438 A1 | 3/2010 | Tan et al. | |
| 2017/0192102 A1* | 7/2017 | Wietfeldt | G01S 19/46 |

OTHER PUBLICATIONS

Peterson et al., "Loran data channel communications using 9th pulse modulation", version 13 (mod1), Oct. 2006, pp. 1-16.
International Loran Association, "Enhanced Loran (eLoran) Definition Document for consulting", Jan. 2007, pp. 1-17.
Dykstra et al., "The Loran Data Channel: Progress to Date and Future Plans," 35th Annual Convention and Technical Symposium of the International Loran Association; Oct. 23-25, 2006; pp. 1-8.
Montgomery et al., "PTTI Capabilities of the Modernized Loran System," 40th Annual Precise Time and Time Interval (PTTI) Systems and Applications Meeting; Dec. 1, 2008; pp. 507-526.
Helwig et al., "eLoran System Definition and Signal Specification Tutorial," UrsaNav; International Loran Associate (ILA-40); Nov. 2011; pp. 1-47.
Mahmood, "Critical Infrastructure Vulnerabilities to GPS Disruptions," Resilient Systems Division, Homeland Security Advanced Research Projects Agency, Science & Technology Directorate; Jun. 4, 2014; pp. 1-17.
Basker et al., "Enhanced Loran (eLoran)," Definition Document; Report Version 0.1; International Loran Association; Jan. 12, 2007; pp. 1-17.

* cited by examiner

TIME TO TRANSMIT
(MEDIUM GRI = 143 MSG/2 MIN)

| MSG | S | MIN | HR |
|---|---|---|---|
| DIFF COR | 38 | .6 | |
| STA ID | 38 | .6 | |
| UTC | 38 | .6 | |
| DEK | 1813 | 30.2 | |
| TEK | 1813 | 30.2 | |
| RX CNTRL | 75 | 1.3 | |
| B MSG | 75 | 1.3 | |
| ALMANAC | 3702 | 61.7 | 1.0 |

STATION SPECIFIC DATA
46

COMMON MESSAGES
NON-STATION SPECIFIC DATA
48

FIG. 2

ENHANCED LORAN (ELORAN) SYSTEM HAVING DIVIDED NON-STATION SPECIFIC ELORAN DATA

FIELD OF THE INVENTION

The present invention relates to the field of communications, and more particularly, to the enhanced Long RAnge Navigation (eLORAN) system and related methods.

BACKGROUND OF THE INVENTION

The LOng RAnge Navigation (LORAN) system was developed in the United States during World War II. Subsequent implementations provided for enhancements in accuracy and usefulness, including LORAN-C and later enhanced LORAN (eLORAN) implementations. The eLORAN system is a low frequency radio navigation system that operates in the frequency band of 90 to 110 kHz and includes transmissions that propagate by ground wave. The eLORAN system transmits LORAN type navigation RF pulses at a center frequency of about 100 kHz and differs from LORAN-C because eLORAN transmissions are synchronized to the UTC similar to GPS, and include time-of-transmission control, differential corrections similar to differential GPS, the use of "all-in-view" tracking, and one or more eLORAN data channels that provide low-rate data messaging, differential corrections, and almanac information.

With the rise of satellite-based navigation systems such as Global Positioning System (GPS), there has been relatively little development or investment in terrestrial-based navigation systems, such as the eLORAN system, until recently. A renewed interest in such systems has arisen as a backup to satellite based navigation and timing systems, particularly since low frequency eLORAN signals are less susceptible to jamming or spoofing compared to the relatively higher frequency and lower powered GPS signals.

The bandwidth limited eLORAN data channel is about a fifty to one hundred bits per second data channel. It carries both time perishable and non-perishable data messages to the end user for proper eLORAN system function, but it is relatively slow and results in low data throughput rates. This eLORAN data channel provides multiple messages to the end user to support eLORAN accuracy, integrity, and availability requirements. These messages transmitted along the eLORAN data channel may include UTC time-of-day, differential corrections, system almanac information, broadcast messages, receiver command control and encryption keys, if applicable. Because of the requirement to prioritize on the eLORAN data channel the transmission of time critical messages, such as differential corrections, other message sets, such as the system almanac information, may take several hours to transmit in their entirety. There is, therefore, a need for further developments in the eLORAN system in certain applications to overcome these drawbacks.

SUMMARY OF THE INVENTION

In general, an enhanced LOng RAnge Navigation (eLORAN) system may include a plurality of eLORAN stations, each comprising an eLORAN antenna, and an eLORAN transmitter coupled to the eLORAN antenna and configured to transmit data over a eLORAN data channel (LDC) and transmit a series of LORAN navigation RF pulses. An eLORAN control station may be configured to generate station specific eLORAN data and non-station specific eLORAN data, divide the non-station specific eLORAN data into a plurality of non-specific eLORAN data subsets, and cause each eLORAN station to transmit the station specific eLORAN data and a corresponding non-station specific eLORAN data subset over the eLORAN data channel.

The non-station specific eLORAN data may comprise almanac information, which may include reference station latitude, reference station longitude, and a reference station correction list. The station specific eLORAN data may comprise station identification and differential eLORAN corrections as well as station specific integrity flags, health indicators and station status. The eLORAN control station may be configured to cause each eLORAN station to sequentially transmit all of the non-station specific eLORAN data subsets. A plurality of eLORAN receivers may be configured to cooperate with the plurality of eLORAN stations.

In some embodiments, each LORAN station may be configured to implement the eLORAN data channel using a ninth pulse modulation scheme, a ninth-tenth pulse modulation scheme, or each eLORAN station may be configured to implement the eLORAN data channel using a Eurofix modulation scheme or some other modulation scheme may be utilized. At least one eLORAN monitoring station may be coupled to the eLORAN control station.

In yet another embodiment, an eLORAN control station may be configured to cooperate with a plurality of eLORAN stations, each comprising an eLORAN antenna, and an eLORAN transmitter coupled to the eLORAN antenna and configured to transmit data over an eLORAN data channel and transmit a series of LORAN navigation RF pulses. The eLORAN control station may comprise a processor and a memory coupled thereto and configured to generate station specific eLORAN data and non-station specific eLORAN data, and divide the non-station specific eLORAN data into a plurality of non-specific eLORAN data subsets, and cause each eLORAN station to transmit the station specific eLORAN data and a corresponding non-station specific eLORAN data subset over the eLORAN data channel.

The station specific eLORAN data may comprise station identification and differential eLORAN corrections, among other data subsets. The processor may be configured to cause each eLORAN station to sequentially transmit all of the non-station specific eLORAN data subsets.

Another aspect is directed to a method for eLORAN control for a plurality of eLORAN stations, each comprising an eLORAN antenna and an eLORAN transmitter coupled to the eLORAN antenna and configured to transmit data over a eLORAN data channel and transmit a series of LORAN navigation RF pulses. The method may include operating a processor and a memory coupled thereto to generate station specific eLORAN data and non-station specific eLORAN data, divide the non-station specific eLORAN data into a plurality of non-specific eLORAN data subsets, and cause each eLORAN station to transmit the station specific eLORAN data and a corresponding non-station specific eLORAN data subset over the eLORAN data channel.

DESCRIPTION OF THE DRAWINGS

Other objects, features and advantages of the present invention will become apparent from the detailed description of the invention which follows, when considered in light of the accompanying drawings in which:

FIG. 2 is a table showing examples of station specific eLORAN data and non-station specific eLORAN data as used in the eLORAN system of FIG. 1.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
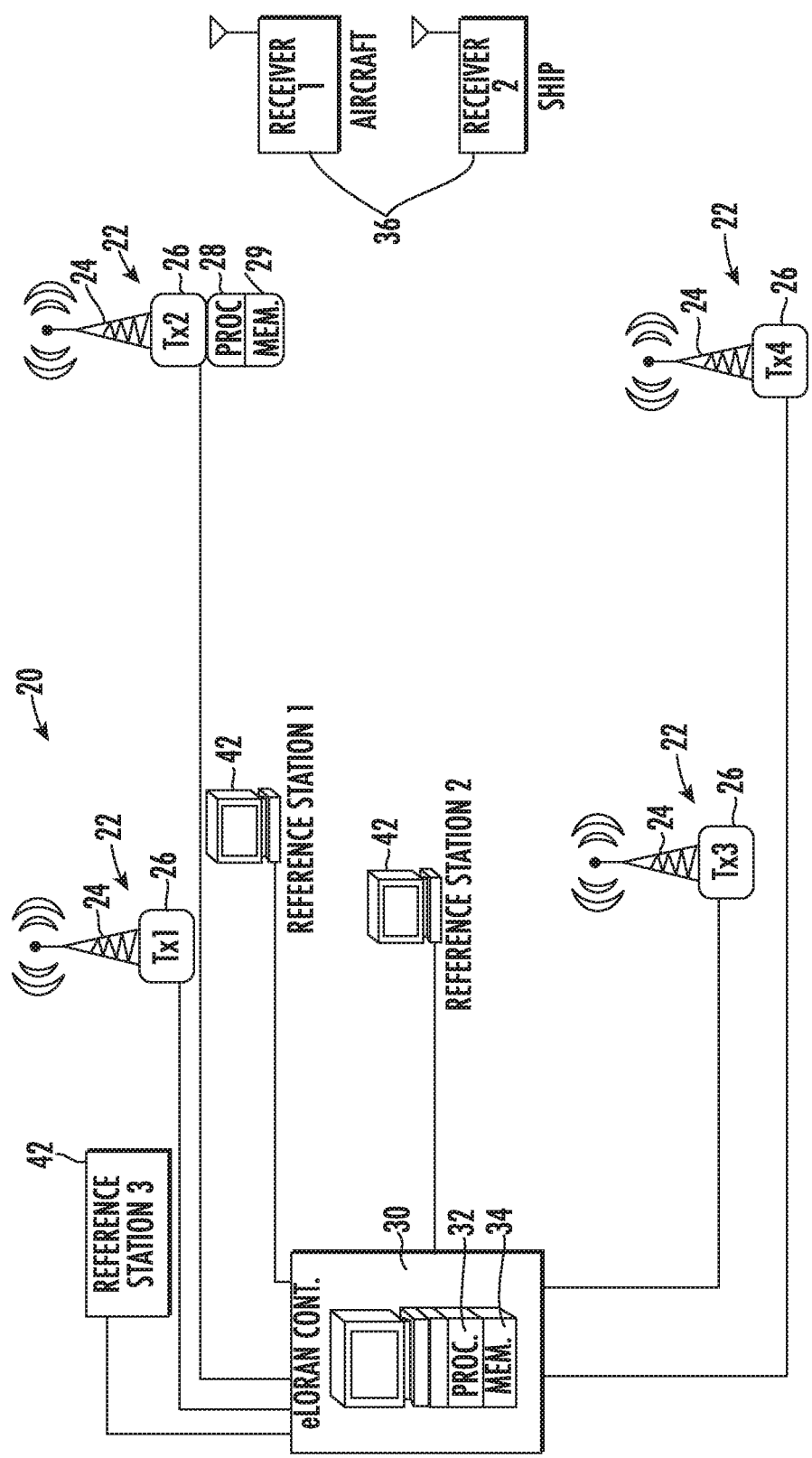
FIG. 1 is a systematic block diagram of an eLORAN system in accordance with an example embodiment.

Referring initially to FIG. 1, there is illustrated generally at 20 an enhanced LOng RAnge Navigation (eLORAN) system that includes a plurality of eLORAN stations 22, each including an eLORAN antenna 24 and eLORAN transmitter 26 coupled to the eLORAN antenna and configured to transmit data over an eLORAN data channel (LDC) and transmit a series of LORAN navigation RF pulses. Four transmitter stations 26 are illustrated and labeled as TX1, TX2, TX3 and TX4, and as shown in the example of the transmitter station 26 labeled TX2, each transmitter station 22 includes a respective processor 28 and memory 29. Each of the transmitter stations 26 is operatively connected to an eLORAN control station 30 that includes a processor 32 and memory 34 coupled thereto and configured to generate station specific eLORAN data and non-station specific eLORAN data that are received by users operating eLORAN receivers 36, which could be located in an aircraft, ship or terrestrial land vehicle, and illustrated schematically with Receiver 1 in an aircraft and Receiver 2 in a ship.

The control station 30 is connected to at least one eLORAN Reference Station 42, and at least one operates as a Differential eLORAN reference station. At least one of the Reference Stations 42 monitors the LORAN navigation RF pulses and processes to determine differential corrections and transmit information regarding those navigation RF pulses to the eLORAN control station 30. In this example as illustrated, the eLORAN system 20 includes three eLORAN Reference Station 42.

The eLORAN system 20 is a positioning, navigation and timing (PNT) service used for aviation, maritime and land-mobile vehicle navigation as well a fixed station timing users. As a location and timing system, it may complement the Global Navigation Satellite Systems (GNSS). The eLORAN transmissions are synchronized to an identifiable, publicly-certified source of coordinated universal time (UTC) independent of the GNSS, and thus, may operate independently of the GNSS. The eLORAN system 20 includes that additional eLORAN data channel on the transmitted signal, thus distinguishing the eLORAN system from traditional LORAN-C systems. This eLORAN data channel transmits application-specific corrections, warnings and signal integrity information, including station specific eLORAN data such as station identification and differential eLORAN corrections and non-station specific eLORAN data such as almanac information, including reference station latitude, reference station longitude, and a reference station correction list.

Referring now to the Time to Transmit table in FIG. 2, examples of the station specific eLORAN data 46 and non-station specific eLORAN data 48 are identified. Common messages are transmitted among the transmitter stations 26 and form the non-station specific eLORAN data 48, which may include encryption keys to encrypt messages. These keys are typically changed frequently. In some systems, the keys are changed daily and in other systems the keys may be changed even for different messages. The common messages forming the non-station specific eLORAN data 48 also include receiver control messages, broadcast messages and almanac information, which may include reference station latitude, reference station longitude and reference station correction lists. The station specific eLORAN data 46 may include station identification data, differential eLORAN corrections, and the UTC time. The differential corrections may include data related to time differential corrections and position differential corrections.

The Time to Transmit table in FIG. 2 has values for a medium GRI (Group Repetition Interval), which corresponds to the time duration of the sequence of pulses, and may include a sequence of timing pulses as master and secondary pulses. Generally, the group petition interval corresponds to the specified time interval for all transmitter stations 26 of a chain to transmit their pulse groups. For each chain, a minimum group repetition interval is selected of sufficient duration to provide time for each transmitter station 26 to transmit its pulse group and an additional time period between each pulse group so that signals from two or more transmitter stations do not overlap in time within the coverage area. The group repetition interval is normally calculated in tens of microseconds and given a whole number designation as a standard. For example, the group repetition interval having 69,950 microseconds corresponds to the standard as "6995," which, for a certain application of the LDC can produce 143 messages over two minutes. This eLORAN data channel has a low data rate usually about 50 to 100 bits per second and provides these multiple messages to a user operating an eLORAN receiver 36 to support the accuracy, integrity and availability requirements in the eLORAN system 20.

Figure 3:
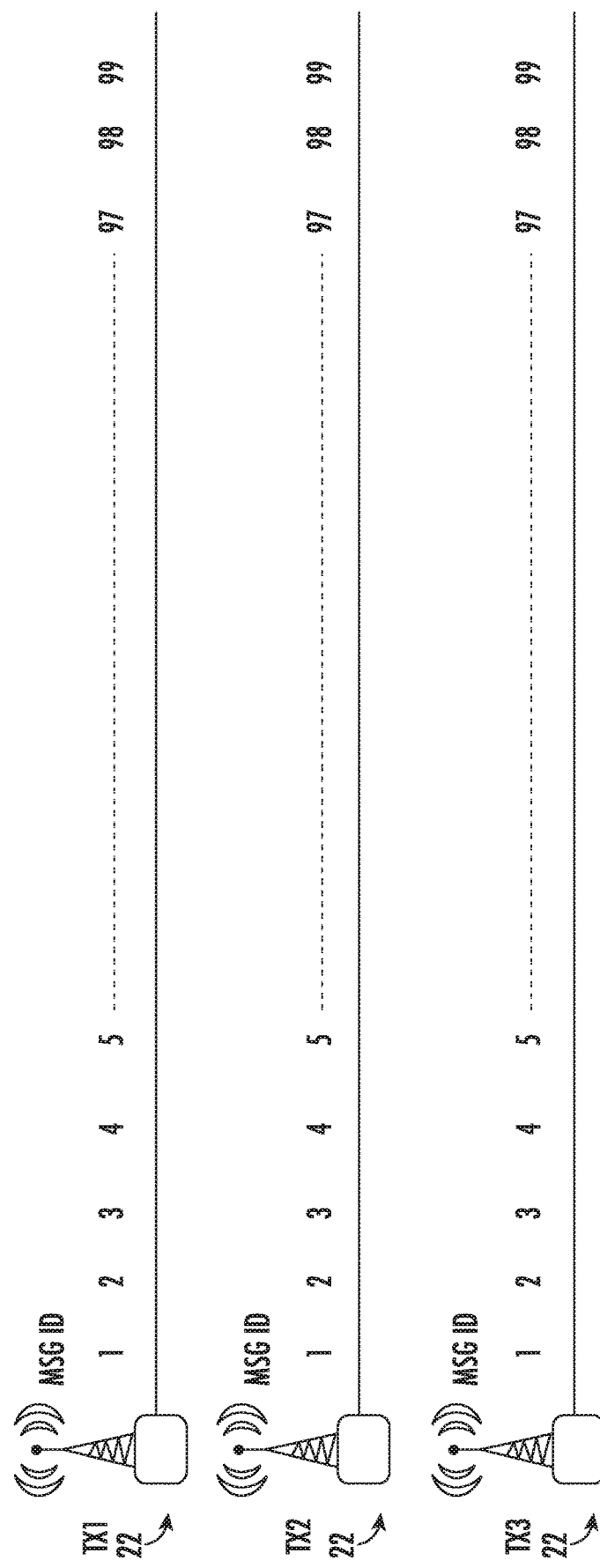
FIG. 3 is a sequence chart showing non-station specific eLORAN data transmitted over the eLORAN data channel from each eLORAN station as in the prior art.

Referring now to FIG. 3, there is illustrated generally how conventional eLORAN stations 22 will transmit almanac information as part of their non-station specific eLORAN data 48 sequentially from all the associated eLORAN stations. Each eLORAN station 22 transmits the same sequence of almanac information in this conventional example. This may cause delay problems in some data transmission because there is a requirement to prioritize transmission of time critical messages such as the differential corrections, while the lower priority message sets, e.g., the almanac information as part of the non-station specific eLORAN data 48, may take one or more hours to transmit in their entirety as shown on the table of FIG. 2, which shows a 1.0 hour transmission time for the almanac information for a specific eLoran system comprised of a multitude of reference stations 42. As illustrated in the sequence of FIG. 3, all messages are transmitted sequentially from each of the associated eLORAN transmitter stations 26.

These more common system messages as part of the non-station specific eLORAN data 48, however, such as the almanac information, can be multi-cast over many transmitter stations 26. The determination of position requires the receipt of a minimum of three transmissions from three separate transmitter stations 26. Most eLORAN systems 10 operate with "all-in-view" eLORAN tracking, where the signals from more than three transmitter stations 26 are routinely tracked. Thus, it is possible to leverage bandwidth of all the eLORAN transmitter stations 26 for transmission of the non-station specific eLORAN data 48 to the end-user.

In an example embodiment, the eLORAN control station 30 is configured to generate the station specific eLORAN data 46 and non-station specific eLORAN data 48 and divide the non-station specific eLORAN data into a plurality of non-specific eLORAN data subsets and cause each eLORAN station 22 to transmit the non-station specific eLORAN data in a corresponding non-station specific eLORAN data subset over the eLORAN data channel. This is a form of alternating message transmission or multiplexing among three or more eLORAN stations 22, where in this example, the almanac information as the almanac messages are multiplexed or "split" between the three eLORAN stations, marked as TX1, TX2 and TX3 in FIG. 4. Each transmit the divided non-station specific eLORAN data subsets. Thus, the total time to receive the full non-station specific eLORAN data is split into three. In this example, if only one eLORAN station 22 is operable for some reason, such as technical difficulties in the other eLORAN stations, the 98 messages would be transmitted from the one eLORAN station in about one hour. If three eLORAN stations 22 are used, on the other hand, then the 33 messages from each eLORAN station would be transmitted in about 0.33 hours, while five eLORAN stations could transmit the messages in about 0.2 hours, thus achieving considerable savings in time to transmit an entire set. In one simulation, it was determined that one eLORAN station 22 could transmit the almanac information in about 61.7 minutes, while three eLORAN stations could transmit the split almanac information in about 20.9 minutes, and five eLORAN stations could transmit the almanac information in about 12.6 minutes.

Figure 4:
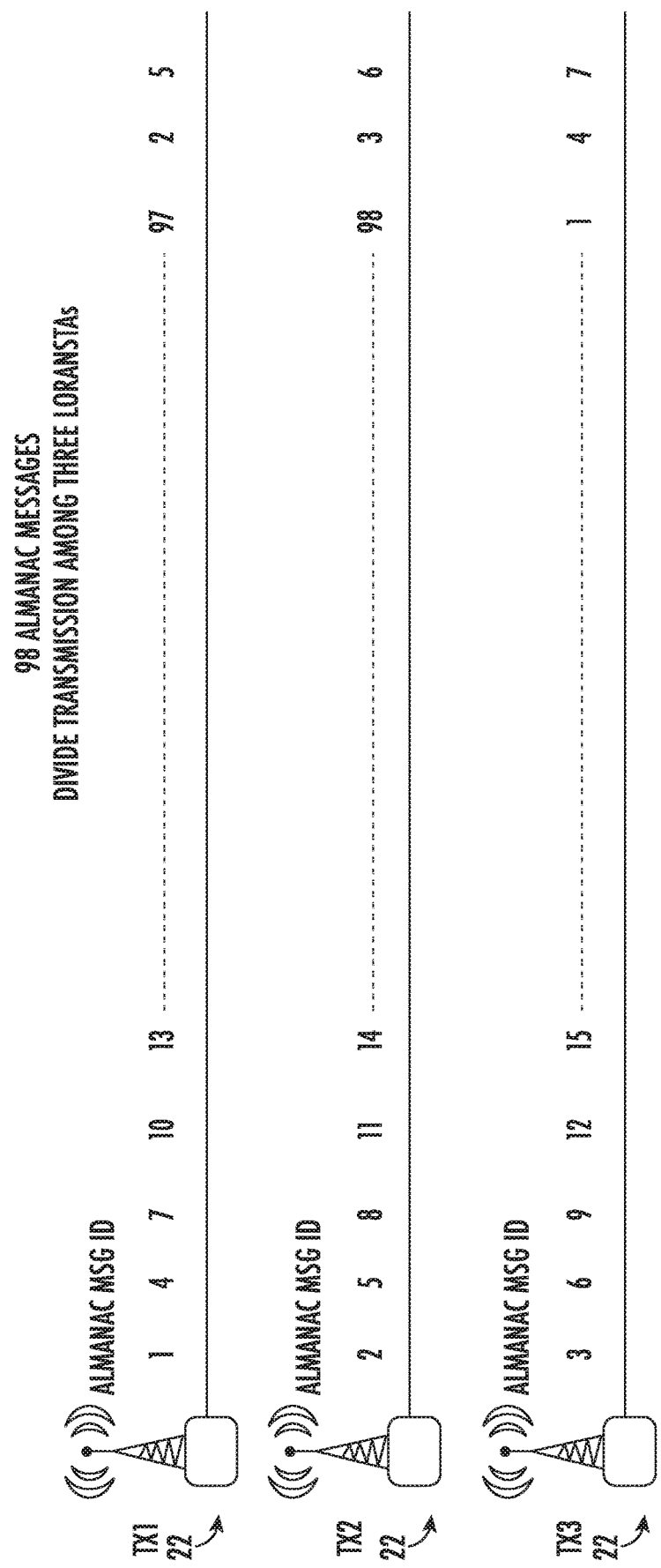
FIG. 4 is a sequence chart similar to that of FIG. 3 and showing the non-station specific eLORAN data divided for transmission into a plurality of non-specific eLORAN data subsets in accordance with an example embodiment.

The eLORAN control station 30 is configured such that each eLORAN station 22 sequentially transmits all the non-station specific eLORAN data sets as shown in FIG. 4, where the sequencing begins at the next subset. For example, a first eLORAN station 22 (TX1) would transmit its sequence of 1, 4, 7 et al. messages and then start again at 2, 5, 8 et al. messages and continue so that the entire set of messages are transmitted. Thus, the sequenced message transmissions repeat and a full message set can still be received from a single transmitter station 26 in a nominal one-tower, i.e., one station transmit time.

Before the eLORAN control station 30 divides the non-station specific eLORAN data 48 into its plurality of non-specific station eLORAN data sets, the eLORAN control station will conduct an analysis of the current eLORAN system 20. Based on the expected propagation coverage, the eLORAN control station 30 will determine the best distribution of transmissions from each eLORAN transmitter station 26, and based on the expected propagation coverage, divide the non-station specific eLORAN data 48 among 3, 4, 5 or more eLORAN transmitter stations 26 at the different eLORAN stations 22.

There now follows further details of the general operation of the eLORAN system 20 with its plurality of eLORAN stations 22, which cooperate with the eLORAN Reference Stations 42. The reference stations 42 and eLORAN control station 30 do not interfere with the timing control of any transmitted signals, and the reference stations 42 may provide augmentation data and may provide real-time corrections to published ASF (Additional Secondary Factor) maps for a complete maritime or other terrestrial coverage area, and provide grid data with nominal propagation corrections per eLORAN station 22. Thus, a user operating one or more eLORAN receivers 36 may apply both the ASF's from the map and any differential eLORAN corrections received over the eLORAN data channel to improve positioning accuracy to better than 20 meters and timing accuracy to better than 100 ns. An eLORAN reference station 42 will calculate and transmit phase corrections continuously. As noted before, the eLORAN system 20 signal structure is between a 90 and 110 kHz frequency band and with a pulse signal usually at about a 100 kHz carrier frequency. The eLORAN signal usually has groups of eight to ten pulses that are spaced about 1 millisecond in a TDMA structure. The transmission of groups repeat every group repetition interval. As many as five different eLORAN stations 22 may share the same group repetition interval to form a chain with a master and secondary transmission. The eLORAN signal envelope shape identifies a reference of zero-crossing, which is synchronized to the UTC. The transmitted signals may be phase coded 0 or 180° for master/secondary identification and mitigation against multiple hop sky waves.

As a non-limiting example, those skilled in the art will understand that different implementations of the eLORAN data channel may exist, such as a three-state pulse position modulation known as the Eurofix modulation system that is standardized by the RTCM and ITU, a 9th pulse modulation system or a $9^{th}$-$10^{th}$ pulse modulation system. The first two modulation systems provide equal data bandwidth of approximately 20 to 50 BPS, while the third provides approximately 100 BPS. All modulation systems are protected by Reed-Solomon forward error correcting code to counter the effects of noise. The Eurofix modulation system has a pulse position modulation of pulses 3 . . . 8 by +1, 0, −1 microseconds, while the $9^{th}$ and $9^{th}$-$10^{th}$ pulse modulation systems have the additional $9^{th}$ or $9^{th}$ and $10^{th}$ pulses of 32 possible values between 0 and 158.75 microseconds. In the Eurofix modulation system as noted before, the pulses are pulse position modulated (ppm) plus or minus (one) 1 microsecond. There are about 729 possible modulation patterns and the pulse position modulated encoding uses about 128 of a possible 141 balanced patterns to represent 7 bits of data per group reputation interval. The data rate may be about 70 to 175 bits per second based on the group repetition interval and uses the forward error correction as Reed-Solomon encoding. In an example, the Eurofix message length is fixed at about 210 bits having 37-bit words.

With the 9th pulse modulation system, the pulse is inserted between the 8th and 9th pulses such as 100 microseconds after the 8th pulse and may use 32-state pulse-position modulation to encode the data at a data rate of about 5 bits per GRI.

The eLORAN system 20 includes the differential eLORAN corrections transmitted within the eLORAN data channel, which may contain ASF phase correction data from the Differential eLORAN Reference Station 42. The almanac information may include the reference station latitude, reference station longitude, and a reference station correction list as noted before. The reference station correction list may have messages that contain the signal ID codes for the corrections from a particular Differential eLORAN Reference Station 42.

In one example, as understood by those skilled in the art, it is possible that the Eurofix modulation system may have 56 bits as a DGPS message. A message may have 14 bits as a cyclic redundancy check for data link integrity, and 140 bits for the Reed-Solomon parity. In addition, 210 bits may correspond to 30 GRI's of 7 bits per message, and thus, correspond to about 1.2 to about 3 seconds per message. The 9th pulse modulation system may have a 32 state pulse position modulation in another example and 5 bits/GRI corresponding to 3 bits phase and 2 bits envelope and phase.

In operation, the eLORAN receivers 36 will have a position calculation based on three or more pseudo ranges to three or more eLORAN stations 22. An eLORAN receiver 36 will measure the arrival times, which convert to pseudo ranges by multiplication with the signal's propagation velocity. It should be understood that this propagation velocity is not equal to the speed of light in a vacuum, but depends on the medium the signals travel in and over, such as over sea, over land, or over mountains. The calculations take into effect the true range, a primary factor, a secondary factor, and an additional secondary factor, together with the variation in those factors and any remaining measurement errors. The receiver clock bias may be used in the position calculation. The primary factor delay accounts for the difference between propagation of the signal in the earth's atmosphere as opposed to in free space and the secondary factor delay accounts for signal propagation over water, especially the ocean. The primary factor and secondary factor are known and considered constant and an eLORAN receiver 36 uses a model to calculate the delays.

The additional secondary factor may be calculated as the delay caused by signal propagation over land and elevated terrain as opposed to over ocean water. The additional secondary factor (ASF) delay build-up depends on the type of soil and other factors and is the total cumulative delay the signal experiences over sections with different ground conductivity. The ASF map can be provided for the operating area as a grid with a survey nominal ASF's for each eLORAN station 22. By not taking the ASF's into account, this could result in positioning errors of several hundred meters to even kilometers. ASF's are published as a map with an ASF grid for each eLORAN station 22. Corrections are broadcast to users and the eLORAN receivers 36 improve their positioning and UTC time accuracy by applying the temporally changing corrections to the current map.

Figure 5:
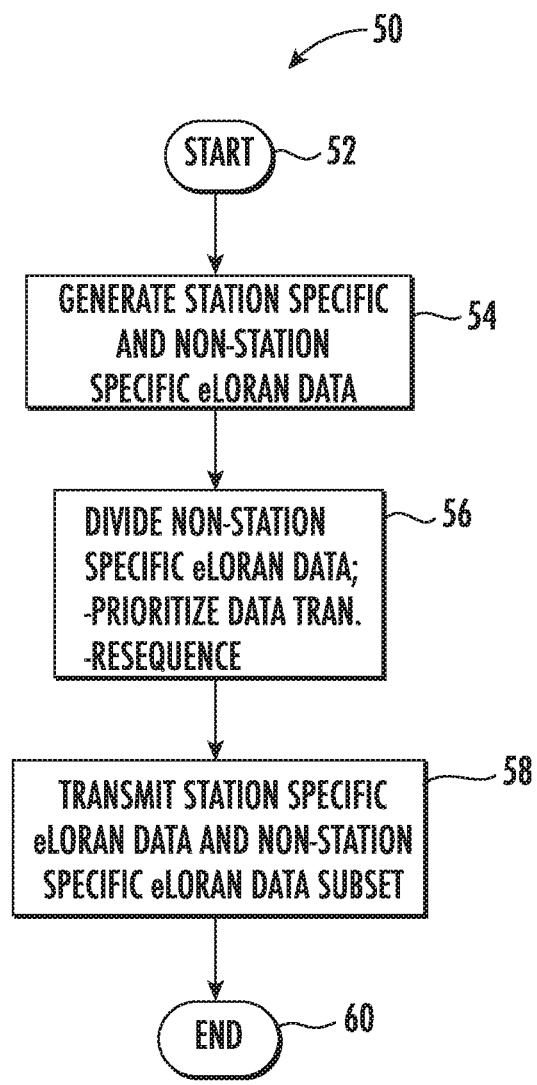
FIG. 5 is a flow diagram illustrating method aspects associated with the eLORAN system in accordance with an example embodiment.

Referring now to FIG. 5, there is illustrated a flow diagram generally at 50 illustrating method aspects associated with the eLORAN system 20 in accordance with an example embodiment for enhanced eLORAN control of the plurality of eLORAN stations 22 as described with reference to FIG. 1. The method begins (Block 52) and includes generating station specific eLORAN data 46 and non-station specific eLORAN data 48 (Block 54) and dividing the non-station specific eLORAN data 46 into a plurality of non-specific eLORAN data subsets (Block 56). This may further include the steps of a) prioritizing the data transmission, and b) resequencing non-station specific data to permit multicasting and multiplexing. Each eLORAN station 22 transmits the station specific eLORAN data 46 and a corresponding non-station specific eLORAN data subset over the eLORAN data channel (Block 58). The process ends (Block 60).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An enhanced LOng RAnge Navigation (eLORAN) system comprising:
   a plurality of eLORAN stations each comprising an eLORAN antenna, and an eLORAN transmitter coupled to the eLORAN antenna configured to transmit data over an eLORAN data channel (LDC) and transmit a series of LORAN navigation RF pulses; and
   an eLORAN control station configured to
      generate station specific eLORAN data and non-station specific eLORAN data,
      divide the non-station specific eLORAN data into a plurality of non-station specific eLORAN data subsets that are split for transmission among the plurality of eLORAN stations, and
      cause each eLORAN station to transmit the station specific eLORAN data and a corresponding different non-station specific eLORAN data subset over the eLORAN data channel.

2. The eLORAN system of claim 1 wherein the non-station specific eLORAN data comprises almanac information.

3. The eLORAN system of claim 2 wherein the non-station specific eLORAN data comprises reference station latitude, reference station longitude, and a reference station correction list.

4. The eLORAN system of claim 1 wherein the station specific eLORAN data comprises station identification, and differential eLORAN corrections.

5. The eLORAN system of claim 1 wherein said eLORAN control station is configured to cause each eLORAN station to sequentially transmit all of the non-station specific eLORAN data subsets.

6. The eLORAN system of claim 1 comprising a plurality of eLORAN receivers configured to cooperate with said plurality of eLORAN stations.

7. The eLORAN system of claim 1 wherein each eLORAN station is configured to implement the LDC using a ninth pulse modulation scheme.

8. The eLORAN system of claim 1 wherein each eLORAN station is configured to implement the LDC using a Eurofix modulation scheme.

9. The eLORAN system of claim 1 comprising at least one eLORAN reference station coupled to said eLORAN control station.

10. An enhanced LOng RAnge Navigation (eLORAN) control station configured to cooperate with a plurality of eLORAN stations each comprising an eLORAN antenna, and an eLORAN transmitter coupled to the eLORAN antenna configured to transmit data over an eLORAN data channel (LDC) and transmit a series of LORAN navigation RF pulses, the eLORAN control station comprising:
   a processor and a memory coupled thereto and configured to
      generate station specific eLORAN data and non-station specific eLORAN data,
      divide the non-station specific eLORAN data into a plurality of non-station specific eLORAN data subsets that are split for transmission among the plurality of eLORAN stations, and
      cause each eLORAN station to transmit the station specific eLORAN data and a corresponding different non-station specific eLORAN data subset over the eLORAN data channel in a prioritized manner.

11. The eLORAN control station of claim 10 wherein the non-station specific eLORAN data comprises almanac information.

12. The eLORAN control station of claim 11 wherein the non-station specific eLORAN data comprises reference station latitude, reference station longitude, and a reference station correction list.

13. The eLORAN control station of claim 10 wherein the station specific eLORAN data comprises station identification, and differential eLORAN corrections.

14. The eLORAN control station of claim 10 wherein said processor is configured to cause each eLORAN station to sequentially transmit all of the non-station specific eLORAN data subsets.

15. A method of enhanced LOng RAnge Navigation (eLORAN) control for a plurality of eLORAN stations each comprising an eLORAN antenna, and an eLORAN transmitter coupled to the eLORAN antenna configured to transmit data over an eLORAN data channel (LDC) and transmit a series of LORAN navigation RF pulses, the method comprising:

operating a processor and a memory coupled thereto to generate station specific eLORAN data and non-station specific eLORAN data, divide the non-station specific eLORAN data into a plurality of non-station specific eLORAN data subsets that are split for transmission among the plurality of eLORAN stations, and cause each eLORAN station to transmit the station specific eLORAN data and a corresponding different non-station specific eLORAN data subset over the eLORAN data channel.

16. The method of claim 15 wherein the non-station specific eLORAN data comprises almanac information.

17. The method of claim 16 wherein the non-station specific eLORAN data comprises reference station latitude, reference station longitude, and a reference station correction list.

18. The method of claim 15 wherein the station specific eLORAN data comprises station identification, and differential eLORAN corrections.

19. The method of claim 15 comprising operating the processor to cause each eLORAN station to sequentially transmit all of the non-station specific eLORAN data subsets.

* * * * *